United States Patent [19]

Young

[11] Patent Number: 4,631,812
[45] Date of Patent: Dec. 30, 1986

[54] PROGRAMMABLE SUBSTRATE TRANSPORT FOR ELECTRONIC ASSEMBLY

[75] Inventor: David H. Young, North Wales, Pa.

[73] Assignee: Quad Systems Corporation, Horsham, Pa.

[21] Appl. No.: 705,684

[22] Filed: Feb. 26, 1985

Related U.S. Application Data

[63] Continuation-in-part of Ser. No. 609,018, May 10, 1984, which is a continuation-in-part of Ser. No. 460,560, Jan. 24, 1983, abandoned.

[51] Int. Cl.⁴ .................. B23P 21/00; B23P 19/00; B23Q 15/00
[52] U.S. Cl. ............................. 29/714; 29/739; 29/740; 29/741; 29/742; 29/822; 29/823; 29/824; 198/586; 198/817; 198/836
[58] Field of Search ............... 29/714, 739, 740, 741, 29/742, 822, 823, 824, DIG. 73; 198/586, 817, 836

[56] References Cited

U.S. PATENT DOCUMENTS

| 3,325,977 | 6/1967 | Kirsten | 198/817 X |
| 3,722,062 | 3/1973 | Gharaibeh | 29/703 |
| 4,422,541 | 12/1983 | Lisec | 198/817 X |
| 4,442,935 | 4/1984 | Gregg | 198/836 X |
| 4,473,150 | 9/1984 | Marchetti | 198/817 |
| 4,502,594 | 3/1985 | Sijbrandij | 198/836 |

FOREIGN PATENT DOCUMENTS

| 23112 | 3/1981 | Japan | 198/817 |
| 66833 | 4/1982 | Japan | 29/417 |

Primary Examiner—Howard N. Goldberg
Assistant Examiner—R. S. Wallace
Attorney, Agent, or Firm—Woodcock Washburn Kurtz Mackiewicz & Norris

[57] ABSTRACT

The present invention relates to an apparatus for the automatic assembly of electronic components and, in particular, relates to a programmable substrate transport mechanism for conveying variously sized substrates to a robotic electronic component assembly machine.

11 Claims, 5 Drawing Figures

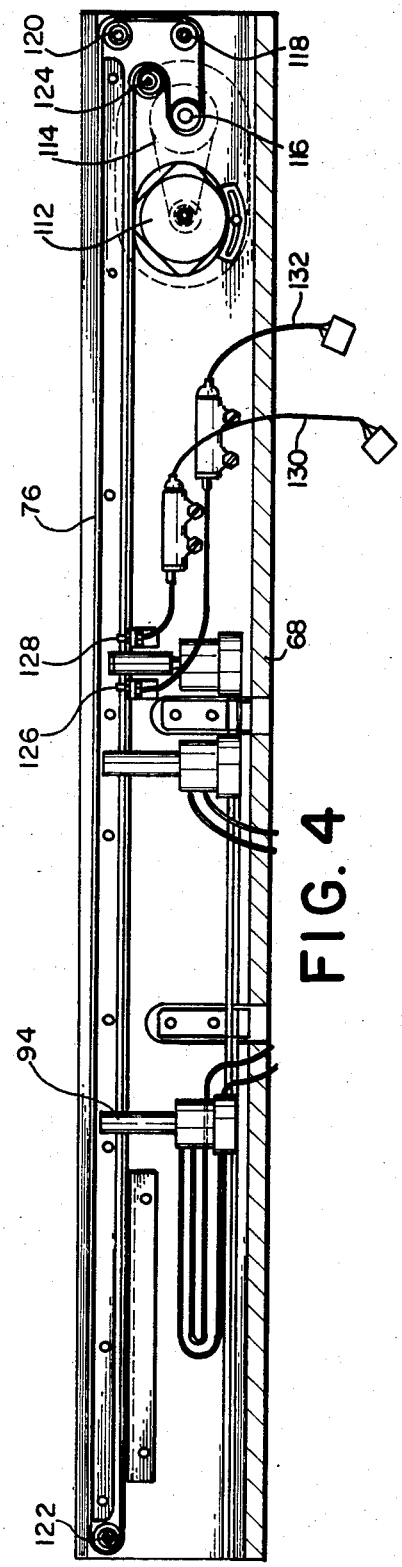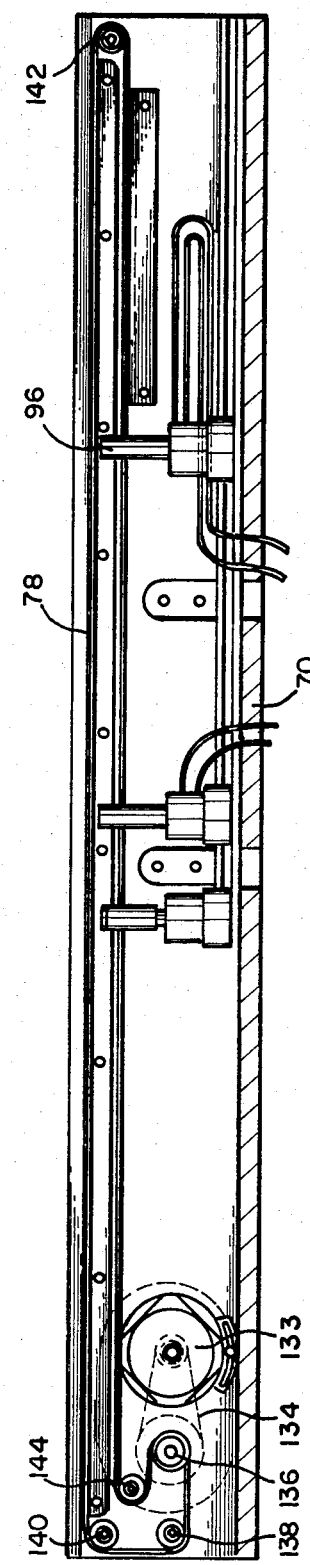

PROGRAMMABLE SUBSTRATE TRANSPORT FOR ELECTRONIC ASSEMBLY

RELATED APPLICATION

This application is a continuation-in-part of Ser. No. 609,018, filed May 10, 1984, entitled "Improved Detachable End Effector For a Robotic System" which, in turn, is a continuation-in-part of Ser. No. 460,560, filed Jan. 24, 1983 now abandoned, entitled "Improved End Effector For a Robotic System", both of which are assigned to the assignee of the present invention and both of which are incorporated herein by reference.

BACKGROUND OF THE INVENTION

In the electronics industry it is typically necessary to locate many different electronic components with respect to an underlying substrate or printed circuit board and to assemble those components to the substrate. With the introduction of the printed circuit board, the assembly of electrical components to that board was typically done by hand. Consequently, labor costs were high. The first automation which was accomplished in the industry was done with dedicated assembly equipment which was used for the assembly of components to a particularly sized and shaped printed circuit board. In this early dedicated assembly equipment circuit boards of a given size and shape were loaded into a magazine and thereafter fed from that magazine by a conveying means to and from an assembly station. Since the dedicated assembly equipment was used for the assembly of a given electronic circuit, automation made economic sense only when the particular circuit being assembled was a high volume item. Moreover, such dedicated assembly equipment was characterized by high capitalization costs.

The electronic industry is characterized by short product life spans or, at least, by product life spans having varying magnitude. Because of the high capitalization costs of dedicated assembly equipment, and because of short product life spans, the dedicated assembly equipment was not particularly useful for the assembly of electronic components in small lots.

Because of these difficulties with dedicated electronic assembly equipment, variable, programmable assembly techniques are now being widely utilized for the placement and assembly of electronic components on printed circuit boards. With these programmable assembly techniques, robotic means are utilized for selecting individual electronic components from a storage area and for transporting those selected components to an assembly station. At the assembly station, the robotic means properly locates the components with respect to the printed circuit board. In the parent applications to the present application improved end effectors for such a robotic means are disclosed. The end effectors described grasp a component to be assembled. The end effectors are fixed to a carriage which locates the end effector with respect to an X-Y plane and, consequently, the components are located with respect to a substrate in that plane. The end effectors are also movable in a Z direction perpendicular to the plane. After the end effector grasps the selected electronic component from a storage location and the carriage moves the end effector from the storage location to the printed circuit board, the end effector moves downwardly in the Z direction and precisely locates the component on the printed circuit board.

Because the robotic means of the parent applications is programmable, various circuits may be assembled by a single programmable assembly means, and the high capital cost of dedicated assembly equipment is avoided as well.

Despite their success, a number of problems remain with prior art programmable assembly techniques utilizing robotic means for the placement of electronic circuit components on substrates or printed circuit boards. One of these problems is the difficulty of conveying unassembled printed circuit boards to the work station for assembly purposes. This problem has, to a certain extent, been solved by the provision of a linear conveying means which directs the unassembled printed circuit boards to the assembly or work station. A further problem is presented, however, by virtue of the fact that printed circuit boards typically are provided in a wide variety of shapes and sizes and, therefore, the linear conveying means for transporting those circuit boards to the assembly station must be capable of accommodating such differing shapes and sizes.

Another problem presented with prior art programmable assembly techniques is that at the assembly station, typical printed circuit boards require the placement of a large number of differing components with respect to a single circuit board. Space constraints, however, limit the number of differing components which may be assembled on a given substrate or circuit board with a given robotic assembly machine. To solve this problem, it has been suggested to employ a plurality of programmable robotic assembly machines with each programmable assembly machine being used for assembling a subset of the total number of components to be assembled on a given printed circuit board. After a given circuit is partially assembled with a first assembly machine the partially assembled circuit board is transferred to a second programmable assembly machine for further assembly. A given circuit board, therefore, may pass numerous programmable assembly stations until the final assembly has been completed. In the past, no suitable means has been provided for the conveyance of partially assembled printed circuit boards from one robotic assembly station to the next where the size and shape of the substrates or circuit boards varies one from another.

In one arrangement which has been suggested a number of programmable assembly machines are configured in an assembly line, with each assembly machine being utilized for fixing a certain subset of components to a particular printed circuit board. A linear conveyor transports a circuit board along the assembly line from one assembly machine to the next. With such an approach, the linear conveyor must be adjusted to accommodate a particular circuit board size and shape. When it is desired to assemble a circuit board having a different size and shape, the linear conveying means of the entire assembly line must be adjusted from the first through the last assembly station to accommodate that differing size and shape. Changeover or set up time from one conveying means configuration to another configuration causes substantial down time and lowers productivity.

It would be particularly desirable to provide a substrate transport means for conveying printed circuit boards and other substrates of varying sizes from one programmable assembly machine to the next along an assembly line. It would be further desirable to provide for the programmable assembly of electronic components to a wide variety of changing circuit board sizes and configurations. It would be still further desirable to provide a programmable substrate transport means which may be used for not only printed circuit board assembly but also for silk screening and for assembly of hybrid planar circuits. These and other objectives are achieved by the provision of the programmable substrate transport mechanism of the present invention.

These and other objects of the present invention are accomplished by means of an apparatus for the assembly of electronic components which preferably comprises a plurality of assembly modules. Each assembly module includes an assembly station to which substrates are directed and at which electronic components are assembled. A programmable linear conveyor directs substrates to each assembly station and a control means adjusts the linear conveyor in accordance with the predetermined width of each substrate and varies the entry width to that conveyor in accordance with the substrate width.

In accordance with the preferred embodiment, at each assembly station, a programmable means for positioning components with respect to a substrate located thereat is provided. This programmable means preferably comprises a carriage and an end effector coupled to the carriage. The carriage grossly positions components with respect to the substrate, and the end effector precisely positions components with respect to the substrate.

In accordance with an important aspect of the present invention, each assembly module includes a conveyor having a first and second movable belt traveling in parallel paths. The aforementioned control means controls the speed of the first and second belts so as to convey substrates to the assembly station. Means are provided for adjusting the distance between the paths in accordance with the predetermined width of each substrate to which assembly is accomplished.

BRIEF DESCRIPTION OF THE DRAWINGS

The present invention will be more fully understood by reference to the accompanying drawings in which:

FIG. 4 is a cross-sectional view of a single assembly module in the direction of section lines 4—4 of FIG. 2; and FIG. 5 is a cross-sectional view of a single assembly module taken in the direction of section lines 5—5 of FIG. 2.

DETAILED DESCRIPTION OF THE PREFERRED EMBODIMENTS

Figure 1:
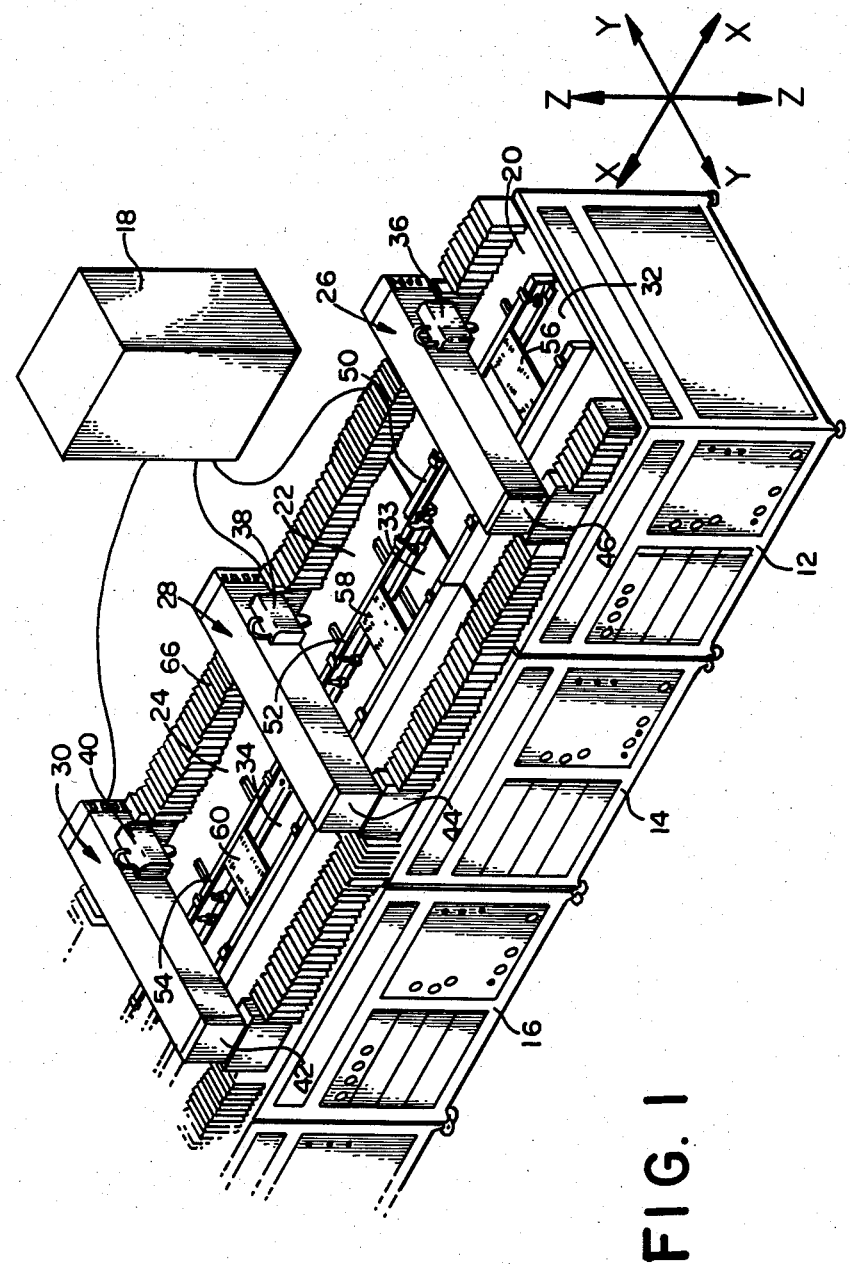
FIG. 1 is a perspective view of a series of assembly modules employing the programmable substrate transport system of the present invention.

Referring now to FIG. 1 an improved apparatus for the assembly of electronic components to a substrate is shown generally at 10. The assembly apparatus 10 preferably comprises a plurality of individual assembly modules. In FIG. 1, three such assembly modules 12, 14 and 16 are shown in detail, although it should be recognized that in carrying out the present invention many such assembly modules may be utilized. As shown in FIG. 1, each of the assembly modules 12, 14 and 16 are positioned adjacent to another end to end. The assembly modules 12, 14 and 16 may be releasably connected to each other to maintain their fixed relationships one to the other. Such connections are preferably made with releasable fastening means so that each of the modules may be moved in relative position if desired. Each of the assembly modules 12, 14 and 16 shown in FIG. 1 are connected to a system controller or computer 18, the purpose of which will become more clear below.

Each of the assembly modules 12, 14 and 16 includes a table means having an upper, preferably horizontal surface, 20, 22 and 24, respectively. These upper surfaces 20, 22 and 24 define an X-Y plane in which component assembly is accomplished. Situated upon the upper horizontal surfaces 20, 22 and 24 are a plurality of robotic assembly means shown generally at 26, 28 and 30 of the type generally described in connection with the parent applications to the present application. Also situated upon each of the upper surfaces 20, 22 and 24 is an assembly station shown generally at 32, 33 and 34 at which component assembly takes place for that module.

Each of the robotic assembly means 26, 28 and 30 comprises an end effector 36, 38 and 40. The end effectors 36, 38 and 40 are movable in the Z direction, i.e., perpendicular to the X-Y plane of the upper surface 20, 22 and 24. The end effectors are affixed to carriage means 42, 44 and 46 which locate the end effectors with respect to the X-Y plane. In other words, each of the end effectors 36, 38 and 40 are movable in the Y direction by means of the carriages 42, 44 and 46. Moreover, each of the carriages 42, 44 and 46 are movable in the X direction such that the end effectors 36, 38 and 40 may be positioned anywhere in the X-Y plane with respect to the upper surfaces 20, 22 and 24 of a given assembly module 12, 14 or 16.

As mentioned, the end effectors 36, 38 and 40 are movable in the Z direction with respect to the upper surfaces 20, 22 and 24 of the assembly module. The end effectors are thus suitable for selecting and grasping individual electronic components at a storage location situated on the aforementioned X-Y plane. The carriages may thereafter move the end effector to an appropriate assembly station at which the components are precisely positioned with respect to a substrate.

In accordance with an important aspect of the present invention, also situated on the upper surfaces 20, 22 and 24 of each of the assembly modules 12, 14 and 16, is a programmably variable linear conveying means 50, 52 and 54, respectively. Each of the conveying means includes a pair of moving belts operating in laterally disposed, parallel paths which are used for transporting substrates in the X direction from one assembly module to the next. Substrates, such as printed circuit boards 56, 58 and 60, are transported by the linear conveyor means 50 in the X direction from the assembly module 16 to the assembly module 14, and by linear conveyor means 52 from the assembly module 14 to the assembly module 12. To accomplish this result, the upper surfaces 20, 22 and 24 of the various modules are of the same height and the liner conveyors 50, 52 and 54 are in alignment. In accordance with the most important aspect of the present invention, each of the substrates 50, 52 and 54 may differ in width from the other and each of the modules may be assembling a given circuit on a substrate of a first width while neighboring modules may be assembling different circuits on substrates of different widths. This result is achieved by virtue of the fact that each of the linear conveying means adjust to the width of the substrates being assembled in accordance with commands received from the system controller 18.

At each assembly station 32, 33 and 34 of the assembly modules 12, 14 and 16 the substrates 56, 58 and 60 are stopped and precisely positioned. When the substrate is at the appropriate assembly station a mechanical stop is activated which precludes the conveyors 50, 52 and 54 from advancing the substrate downstream. When the substrate is so positioned, electronic components having previously been grasped by the end effectors 36, 38 and 40 are grossly positioned in the X-Y plane with respect to the substrate and the end effectors 36, 38 and 40, are then positioned in the Z direction so as to precisely and accurately locate the component with respect to the substrate. After the components to be assembled at a particular assembly station have been added to the substrate, the substrate is advanced to the next assembly module for the assembly of further electronic components.

Figure 2:
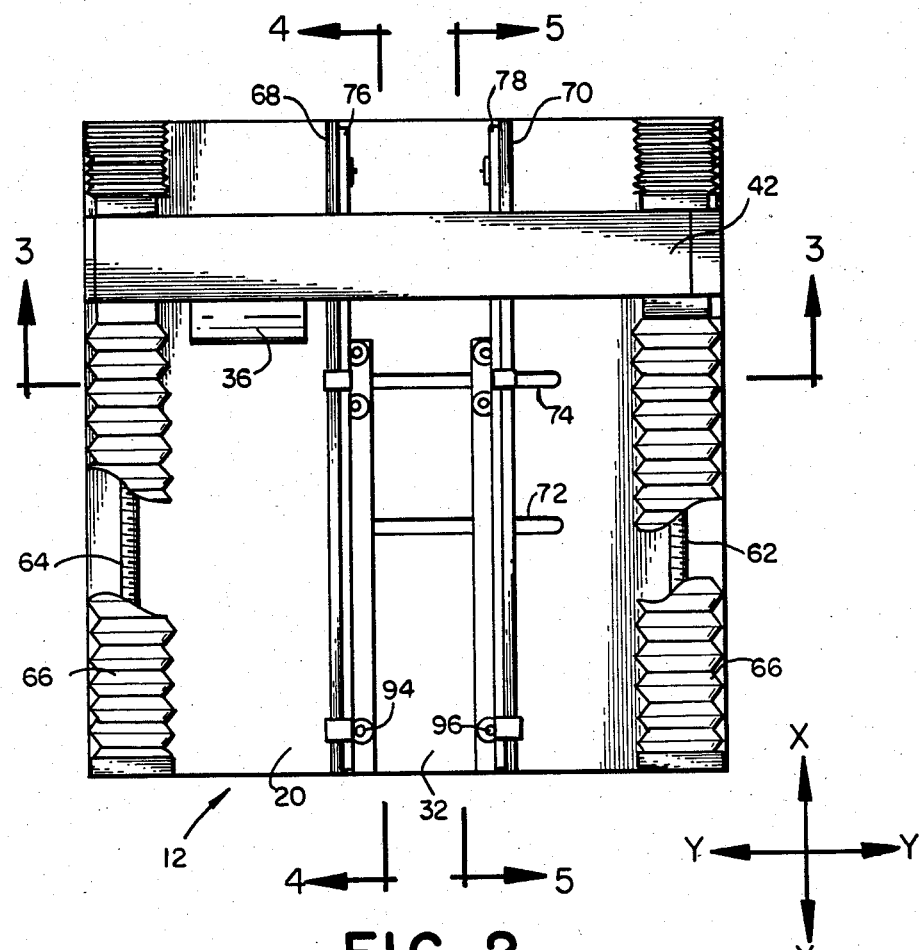
FIG. 2 is a top or plan view of a single assembly module.
Figure 3:
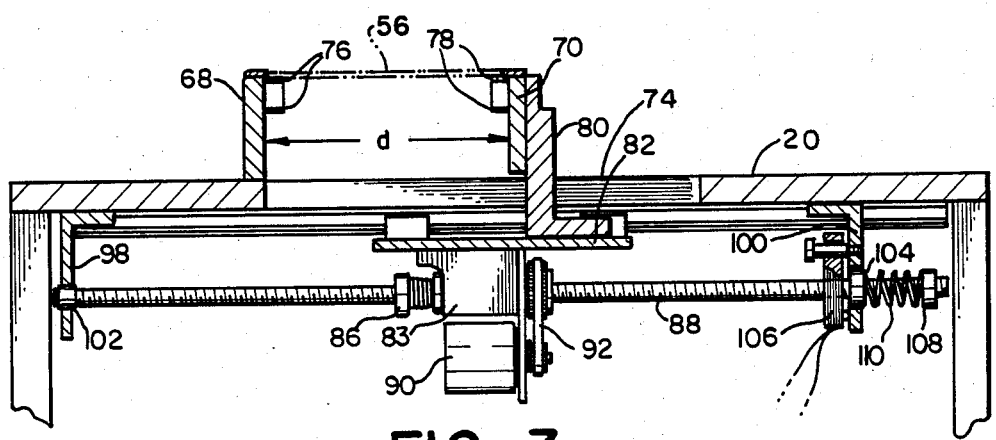
FIG. 3 is a partial cross-sectional view of a single assembly module taken along section lines 3—3 of FIG. 2.

Referring now to FIGS. 2-4, a particular assembly module 12 will be described in further detail, the assembly modules 14 and 16 being similar. As shown in FIG. 2, the upper surface 20 of the assembly module 12 is a horizontal plane. The carriage means 42 situated on that upper surface 20 is movable in the X direction. Movement of the carriage 42 in the X direction is controlled by means of a pair of lead screws 62 and 64 in a manner well known to those skilled in the art. A collapsible structure or bellows 66 covers each of the lead screws 62 and 64 and provides a safety barrier to prevent personnel and components from obstructing the free travel of the carriage 42 in the X direction. Also situated on the upper surface 20 of the assembly module 12 is the linear conveyor 50 referred to above. The linear conveyor 50 is comprised of a first, fixed rail 68 and a second rail 70, the second rail 70 being movable with respect to the first rail 68 in a manner which will be described below. The distance, d, between the fixed and movable rails 68 and 70 defines the entry width to the linear conveyor means 50. The movable rail 70 may be translated in the Y direction such that the distance between the first and second rails 68 and 70 may be varied in accordance with the width of the substrates being directed to the assembly station 32.

The first or fixed rail 68 provides a supporting structure for a first movable belt 76, whereas the second, movable rail 70 provides a vertical support for a second movable belt 78. The first and second movable belts 76 and 78 travel in parallel paths and at the same forward speed and are utilized for conveying substrates to the assembly station 32 of the assembly module 12.

Movement of the second movable rail 78 with respect to the first or fixed rail 68 will be understood by reference to both FIGS. 2 and 3. As shown in FIG. 2, slots 72 and 74 are formed in the upper surface 20 of the assembly module 12. As shown in FIG. 3, the second or movable rail 78 is fixed to a vertical member or support comprised of bracket 80. The bracket 80 extends through the slot 74 of the upper surface 20 and is coupled to a carriage plate 82 situated on the undersurface 84 of the assembly module 12. A similar bracket (not shown) also extends through slot 72 thereby connecting the second rail 70 to the carriage plate 82 at a second location. Attached to the lower surface of the carriage plate 82 is a housing 83 in which an internally threaded member 86 is rotationally mounted. The threaded member is threadedly engaged with respect to a lead screw 88 running transversely of the path of travel of substrates across the upper surface 20. Also fixedly mounted with respect to the carriage plate 82 is a drive motor 90. The drive motor 90 is coupled to the aforementioned threaded means 86 by means of a drive belt 92. The drive motor is controlled by the system controller 18.

In accordance with an important aspect of the present invention, activation of the drive motor 90 causes rotation of the threaded member 86 via the drive belt 92 which, in turn, causes the carriage plate 82 to move relative to the lead screw 88 in either direction along the Y axis. Movement of the carriage plate 82, in turn, causes movement of the bracket 80 and, in turn, movement of the second or movable rail 70 with respect to the first fixed rail 68. In sum, the drive motor 90 acts upon the movable rail 70 to vary the distance, d, between the fixed and movable rails thereby accommodating substrates of different widths. In this manner, conveyor 50 transports a wide variety of substrates may be transported via the linear conveyor 50 to the assembly station 32.

As shown in FIG. 3, the lead screw 88 is supported on the undersurface 84 of the assembly module 12 by means of downwardly depending brackets 98 and 100. The lead screw is rotatably journaled within bushings 102 and 104, respectively. A pressure switch mounting 106 is fixed to the lead screw 88 and is normally in the position shown in FIG. 3 abutting the downwardly depending bracket 100. Also fixed to the end of the lead screw 88 is a collar 108. A spring 110 is situated around the lead screw 88 and is fixed between the downwardly depending bracket 100 and the collar 108 so as to normally bias the lead screw 88 to the right as shown in FIG. 3, thereby keeping the switch mounting 106 adjacent to the bracket 100. A normally closed pressure switch (not shown) is situated between the pressure switch mounting 106 and the downwardly depending bracket 100.

In operation, as the movable rail 70 moves from right to left as shown in FIG. 3, the lead screw 88 remains stationary. When the movable rail 70 encounters a substrate such as substrate 56 shown in phantom in FIG. 3, however, the threaded member 86 imposes a force upon the lead screw 88 tending to cause the lead screw 88 to move leftwardly against the bias of the spring 110. Such movement tends to cause the pressure switch mount 106 to move away from the downwardly depending bracket 100 thereby opening the pressure switch. The pressure switch is coupled to the system controller 18 which immediately deactivates the drive motor 90.

At the assembly station 32 (FIG. 2), lifters 94 and 96 (FIG. 2) are provided. These lifters, as will be more fully explained below, are movable in the Z direction and are activated either electrically or pneumatically. The lifters 94 and 96 normally project above the path of an incoming substrate so as to provide a mechanical stop when the substrate traveling on the linear conveyor 50 reaches the assembly station 32. When all assembly has been completed at the assembly station 32, the lifters 94 and 96 may be retracted in a manner which will be described below such that the substrate may continue downstream to the next assembly module.

Referring now to FIGS. 4 and 5, details of the fixed and movable rails will be seen. As shown in FIG. 4, the first or fixed rail 68 supports a first drive motor 112. The drive motor acts via a belt 114 which is coupled to a drive pulley 116. The drive pulley 116 is utilized to drive the first movable belt 76. The path of the first belt 76 passes first, second, third and fourth pulleys 118, 120, 122 and 124 as shown. The first drive means 112 comprises a stepper motor linked to the system controller 18.

The first rail 68 further supports the lifter 94. The lifter 94 is movable in the Z direction and may be selectively activated from a position as shown in FIG. 4 to a position above the upper surface of the first movable belt 76. Reflective optical sensors 126 and 128 are provided which sense the presence or absence of a substrate. The output of the sensors 126 and 128 are directed to the system controller 18 by means of leads 130 and 132.

Referring now to FIG. 5, the second or movable rail 70 will be seen. The second or movable rail 70 supports a second drive means or stepper motor 133 which, like the first drive means 112, is directed by the system controller 18. Preferably, common drive pulses are utilized so that the first and second drive motors 112 and 133 operate synchronously. The second drive means 133 is coupled via a belt 134 to a drive pulley 136. The drive pulley 136 along with pulleys 138, 140, 142 and 144 define the path of the second moving belt 78. Because the first and second drive means 112 and 133 for the belts 76 and 78, respectively, are driven synchronously, no skewing of the substrates or circuit boards takes place as the boards move across the linear conveyor.

Also carried by the second or movable rail 70 is the lifter or stop 96 which is aligned with the lifter or stop 94. The lifter 96 is selectively projectable above the path of the second belt 78 such that together the stops 94 and 96 provide a front edge reference for the substrate upon which assembly is to be conducted.

While a particular embodiment of the present invention has been shown and described, it will, of course, be understood that various modifications may be made without departing from the principles of the invention. The appended claims are, therefore, intended to cover any such modifications within the true spirit and scope of the invention.

What is claimed is:

1. An apparatus for the assembly of electronic components to a plurality of substrates each having differing sizes and shapes comprising:
   (A) a first assembly module having:
      a first assembly station to which substrates are directed and at which electronic components are assembled to them;
      a first conveyor for directing substrates to and from said first assembly station; and
      programmable means for positioning a component to be assembled with respect to substrates located at said first assembly station;
   (B) a second assembly module in abutting relationship with respect to said first assembly module and cooperatively engaged with respect thereto having:
      a second assembly station to which substrates are directed and at which said electronic components are assembled to them;
      a second conveyor aligned with the first conveyor of said first assembly module for directing substrates from said first assembly module to and from said second assembly station; and
      programmable means for positioning a component to be assembled with respect to said substrate located at said second assembly station; and
   (C) control means for adjusting said first and said second conveyors in accordance with the predetermined width of each substrate wherein said first and said second assembly modules may be utilized for simultaneously assembling components to substrates of differing widths.

2. The assembly apparatus of claim 1 wherein said first and said second assembly modules each comprise:
   a table means having an upper surface, said assembly stations being at a fixed position relative to said surface.

3. The assembly apparatus of claim 2 wherein said programmable means for positioning comprises:
   a carriage means; and
   an end effector coupled to said carriage means, said carriage means grossly positioning said components with respect to said substrate and said end effector means precisely positioning said components with respect to said substrate.

4. The assembly apparatus of claim 1 wherein each of said first and said second conveyors further comprise:
   a first and a second movable belt, the paths of said movable belts being parallel to each other; and
   means for automatically varying the distance between said belts in accordance with the predetermined width of each substrate.

5. The assembly apparatus of claim 4 wherein each of said first and said second conveyors further comprises:
   a first rail and a second rail, said first and said second movable belts being respectively mounted thereon, said second rail being movable with respect to said first rail to accommodate substrates of varying width.

6. An apparatus for the assembly of electronic components to a plurality of substrates, each having a different size and shape comprising:
   a first assembly module having:
      a first and second movable belt traveling in paths parallel to each other for directing substrates to and from a first assembly station;
      means for adjusting the distance between said paths in accordance with the predetermined width of each substrate to which said components are to be assembled; and
   a second assembly module in abutting relationship with respect to said first assembly module and cooperatively engaged with respect thereto having:
      a second and third movable belt traveling in paths parallel to each other for directing substrates to and from a second assembly station;
      means for adjusting the distance between the paths of said third and fourth belts in accordance with the predetermined width of each substrate to which components are to be assembled; and
   common control means for controlling the speed of said belts and both of said adjusting means in response to said predetermined width.

7. The assembly apparatus of claim 6 further comprising:
   stop means at each of said assembly stations responsive to said control means for precisely locating substrates at said assembly stations.

8. The assembly apparatus of claim 7 wherein said stop means further comprises:

lifting means movable from a position below the paths of said belts and out of the path of said substrates to and from said assembly stations to a position above the path of said belts and into the path of said substrates to and from said assembly stations whereby said substrates may be stopped at said assembly stations or advanced beyond them depending upon the relative position of said lifting means.

9. The assembly apparatus of claim 6 wherein each of said means for adjusting further comprises:
a first rail supporting one of said belts; and
second rail supporting another of said belts, said second rail being movable with respect to said first rail.

10. The assembly apparatus of claim 9 wherein each of said assembly modules includes a table means and wherein said first and said second rails are supported on an upper surface thereof.

11. The assembly apparatus of claim 10 wherein each of said means for adjusting further comprises:
drive means beneath said upper surface and coupled to said another rail, said drive means being responsive to said control means; and
means for deactivating said drive means whenever the distance between said path substantially equals the width of said substrate.

* * * * *